United States Patent
Krzysztalowicz

[11] Patent Number: 5,863,358
[45] Date of Patent: Jan. 26, 1999

[54] STEEL ALLOY SAW BLADE BACKING STRIP

[75] Inventor: Daniel Krzysztalowicz, Munkfors, Sweden

[73] Assignee: Uddeholm Strip Steel Aktiebolag, Munkfors, Sweden

[21] Appl. No.: 903,920

[22] Filed: Jul. 31, 1997

Related U.S. Application Data

[63] Continuation of Ser. No. 640,810, filed as PCT/SE94/01097, May 6, 1996, published as WO95/16057, Jun. 15, 1995, abandoned.

[30] Foreign Application Priority Data

Dec. 9, 1993 [SE] Sweden ................................ 9304089

[51] Int. Cl.$^6$ .............................. C22C 38/34; C22C 38/02
[52] U.S. Cl. ............................................. 148/333; 148/328
[58] Field of Search .................................. 148/333, 328

[56] References Cited

U.S. PATENT DOCUMENTS

| | | | |
|---|---|---|---|
| 3,854,363 | 12/1974 | Merkell et al. | 148/333 |
| 4,036,640 | 7/1977 | Philip et al. | 420/102 |
| 4,140,524 | 2/1979 | Oberholtzer et al. | 420/99 |
| 5,417,777 | 5/1995 | Henderer | 148/334 |

FOREIGN PATENT DOCUMENTS

| | | | |
|---|---|---|---|
| 2066442 | 6/1971 | France | 148/333 |
| 47-9901 | 3/1972 | Japan | 148/333 |
| 87/02311 | 4/1987 | WIPO . | |
| 89/04763 | 6/1989 | WIPO . | |

*Primary Examiner*—Deborah Yee
*Attorney, Agent, or Firm*—Griffin, Butler Whisenhunt & Szipl

[57] ABSTRACT

A steel alloy contains in weight-% 0.5–1.0 C, 1–2 Si, max 0.2 Mn, preferably max 0.001 S, 0.1–0.5 Cr, balance essentially only iron. In the form of a cold rolled, hardened and tempered strip it can be used as a backing material for band saw blades, frame saw blades and circular saw blades, where the teeth are tipped with a different material than the backing material. This steel strip has a structure consisting of tempered martensite, and possibly remaining carbides, obtainable by hardening from a temperature between 780° and 1000° C. and tempering at a temperature between 200° and 550° C.

11 Claims, 7 Drawing Sheets

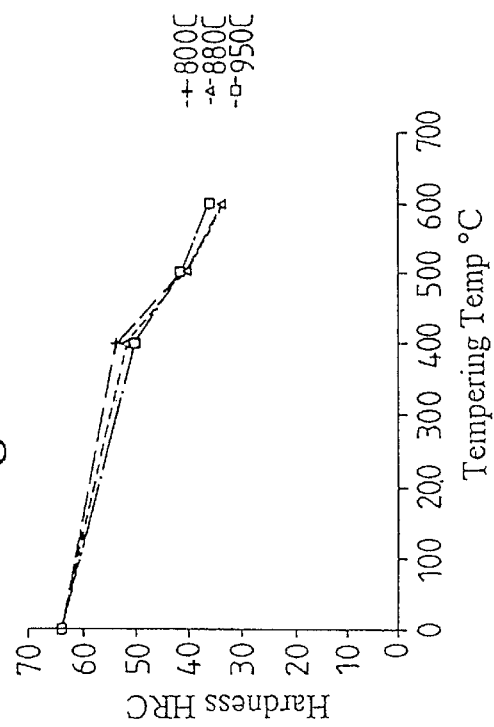
Fig.1. Steel No 1
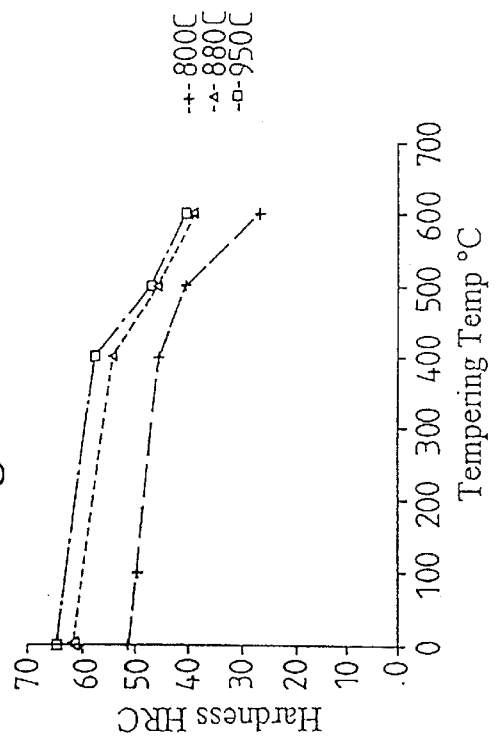
Fig.2. Steel No 2
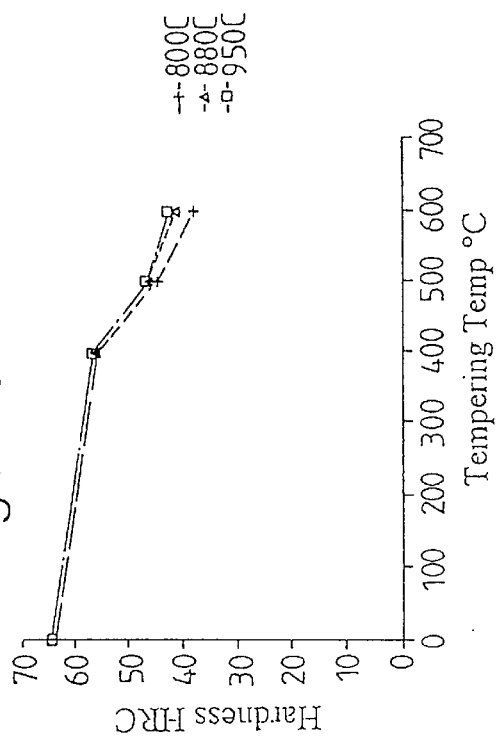
Fig.3. Steel No 3
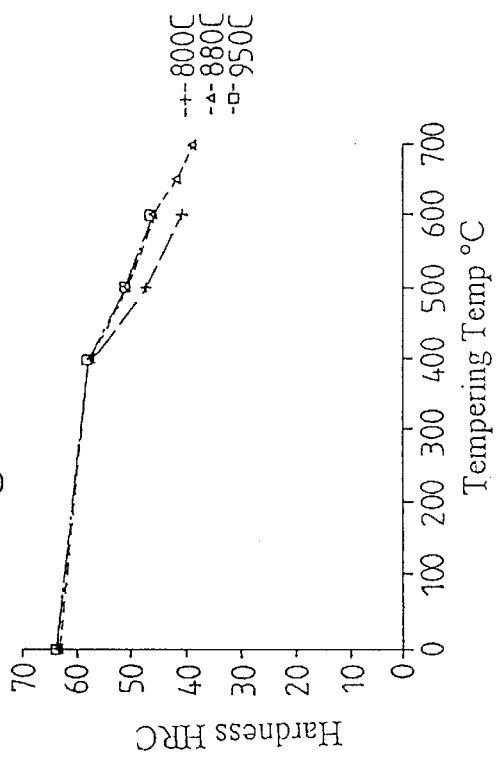
Fig.4. Steel No 4

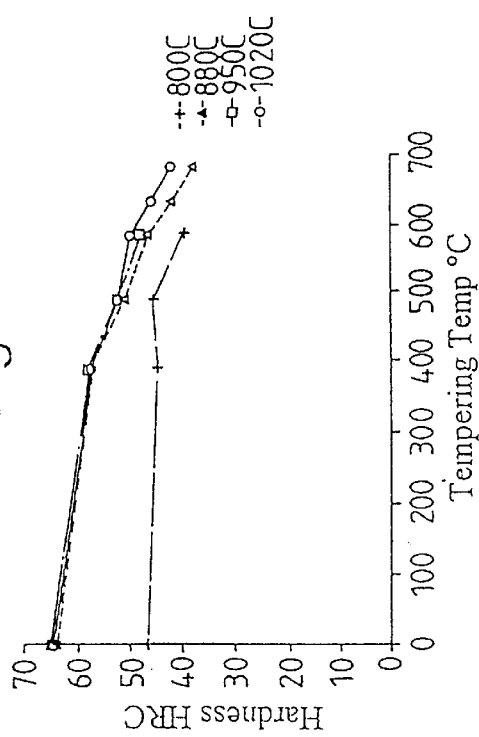
Fig.5. Steel No 5
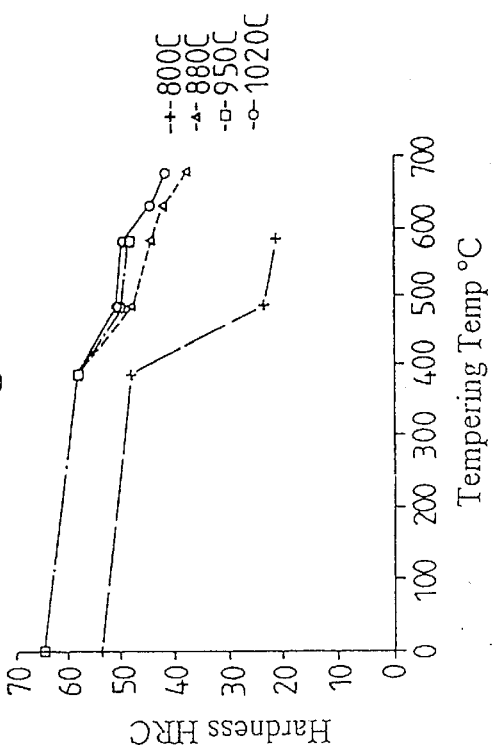
Fig.6. Steel No 6
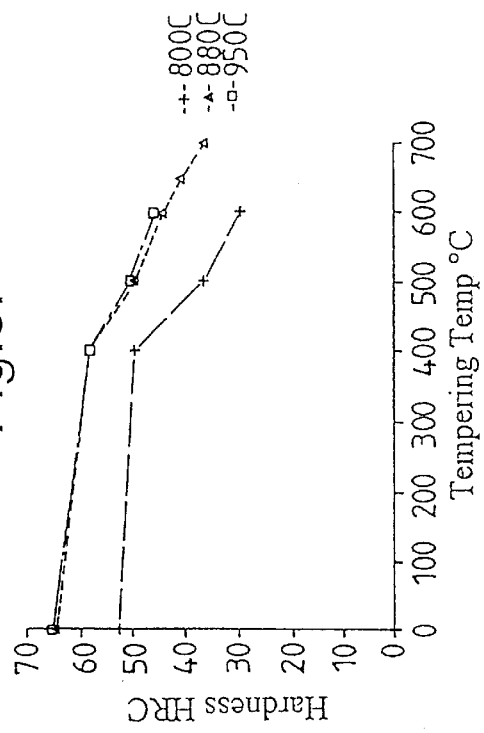
Fig.7. Steel No 7
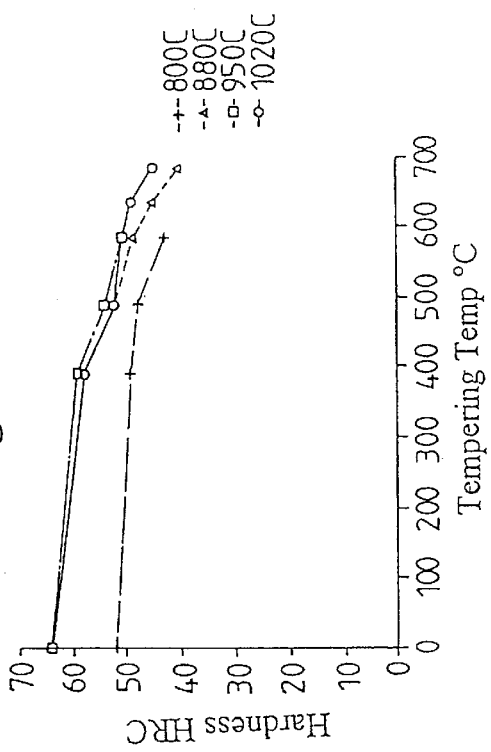
Fig.8. Steel No 8

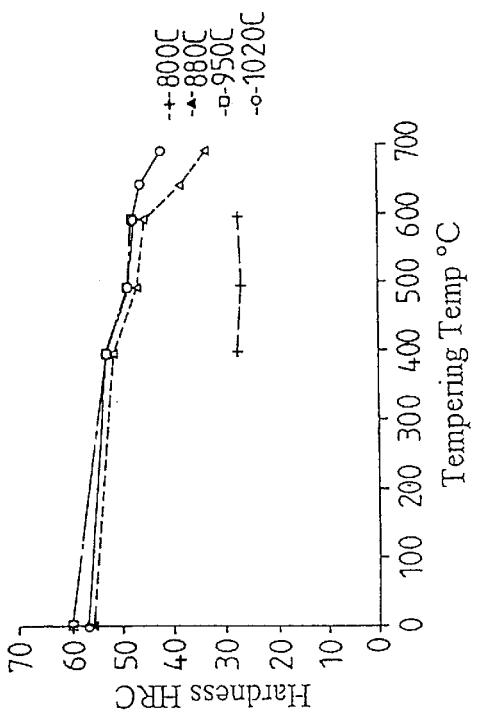
Fig.10. Steel No 10
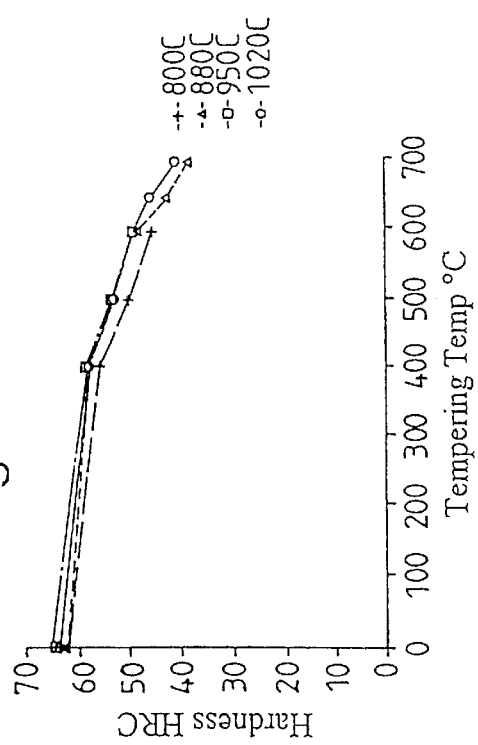
Fig.9. Steel No 9
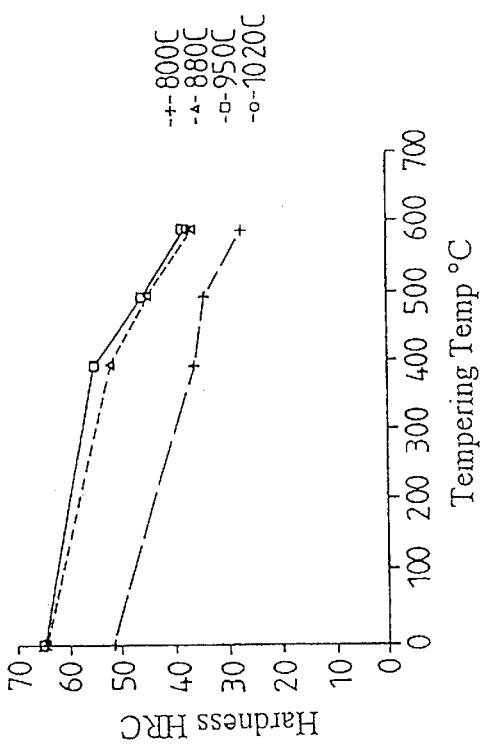
Fig.11. Steel No 11

Steel No. 1

Steel No. 2

Steel No. 11

Steel No 1, 44 HRC

Steel No 3, 44 HRC

Steel No 4, 44 HRC

Steel No 5, 44 HRC

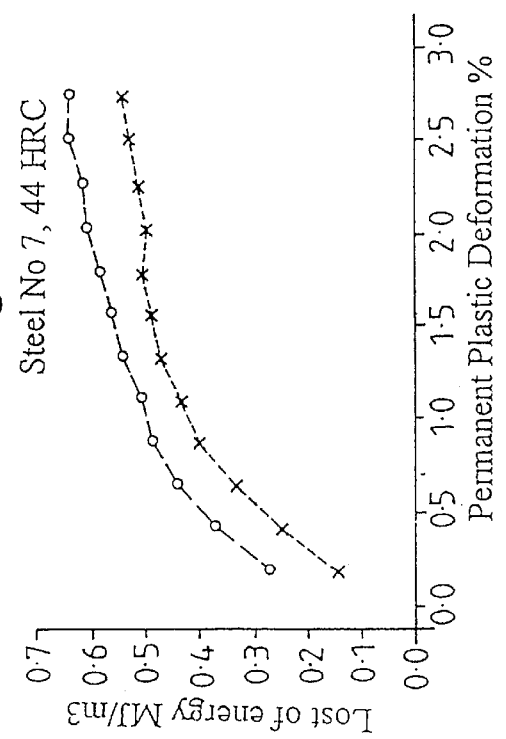
Fig.20. Steel No 7, 44 HRC
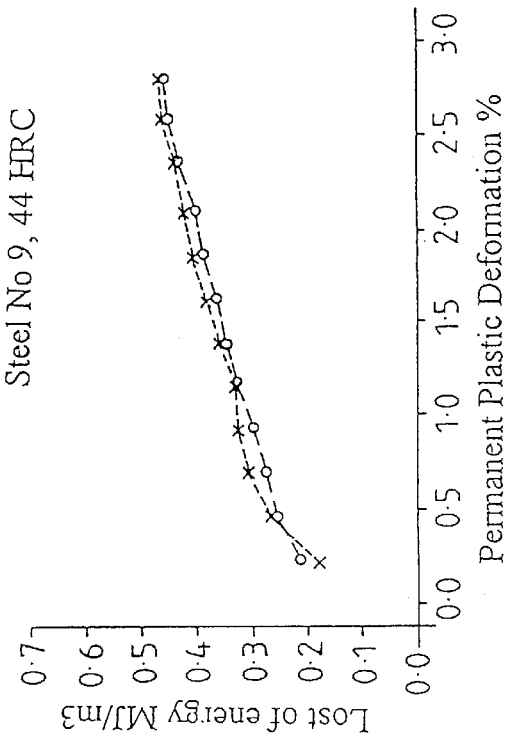
Fig.22. Steel No 9, 44 HRC
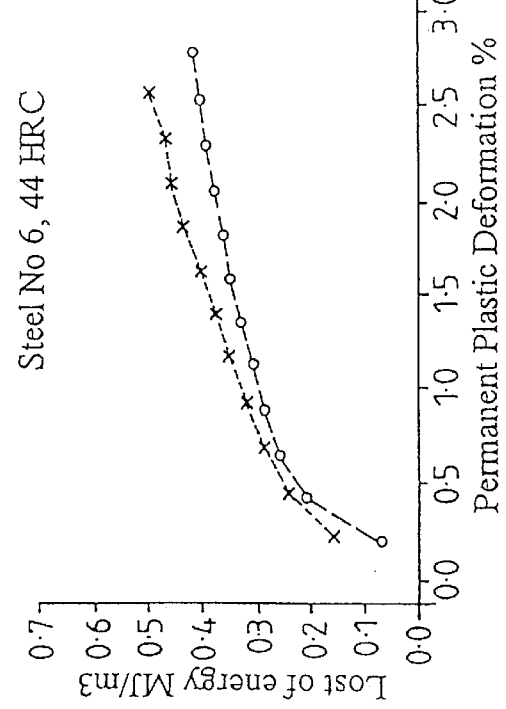
Fig.19. Steel No 6, 44 HRC
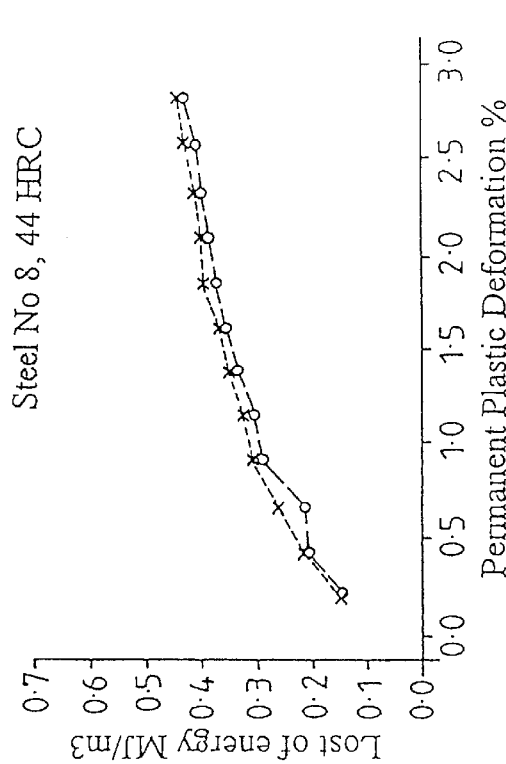
Fig.21. Steel No 8, 44 HRC

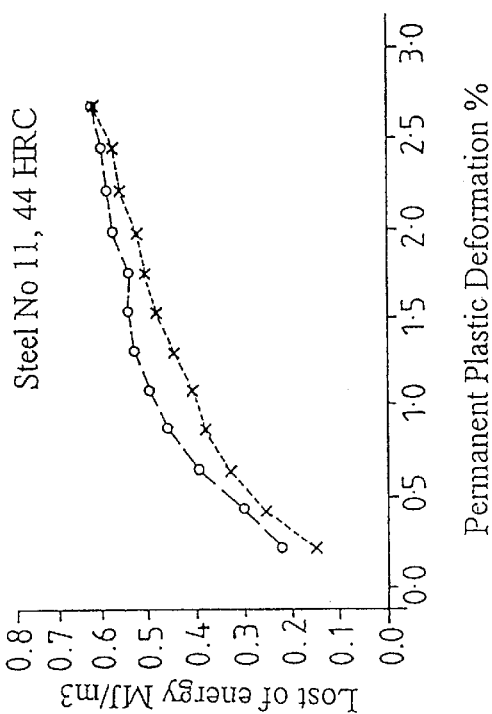
Fig.23. Steel No 10, 44 HRC
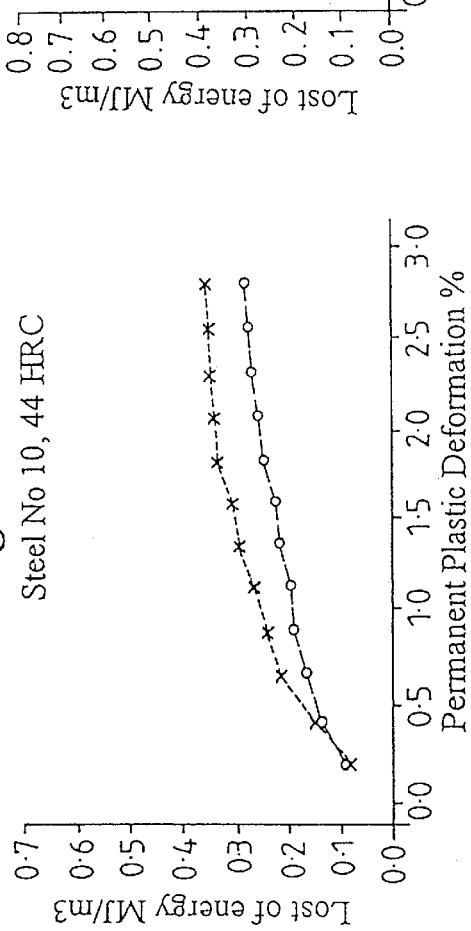
Fig.24. Steel No 11, 44 HRC
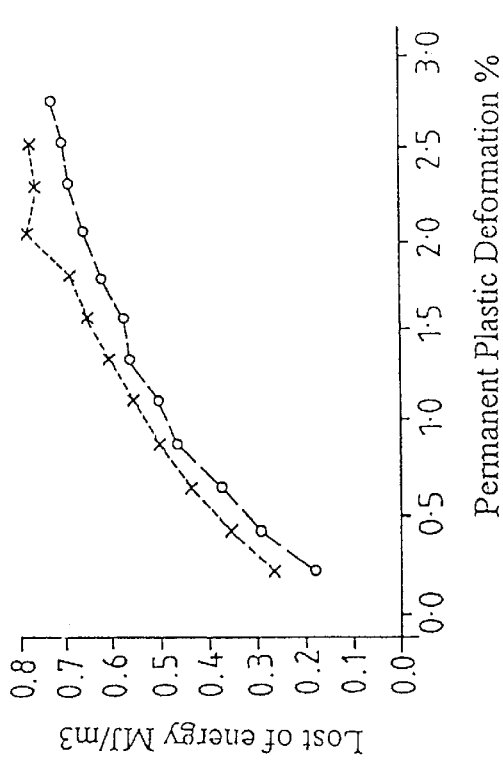
Fig.25. Steel No 11, 48 HRC

STEEL ALLOY SAW BLADE BACKING STRIP

This application is a continuation of Ser. No. 08/640,810, filed as PCT/SE94/01097, May 6, 1996, published as WO95/16057, Jun. 15, 1995, now abandoned.

TECHNICAL FIELD

The invention relates to a new steel alloy, steel strips made of the alloy, as well as the use of the steel strips. Particularly, the invention concerns the use of said steel strips as a backing (body) material for band saw blades, frame saw blades as well as circular saw blades, where the tooth tips consist of a different material.

BACKGROUND OF THE INVENTION

Steel strips for band saw blades, frame saw blades as well as circular saw blades conventionally are made of a steel which provides a good swaging and/or spring setting ability in combination with high wear and fatigue resistance, which features are worthwhile for conventional band saw blades, frame saw blades and circular saw blades where the entire blade consists of a single material and the saw teeth are shaped by plastic deformation and grinding. These features of the blade, however, are not of significant importance for band-saw blades, frame saw blades, and circular saw blades of the type where the tooth tips are secured to a backing material through welding or brazing or are produced by working an edge portion which is secured to the backing material through brazing or welding. This type of band saw blades, frame saw blades, and circular saw blades are more and more common, because they offer an opportunity to use, as a material for the tooth tips, a material having a very high wear resistance, e.g. Stellite®, which is a registered trademark of Stoody Deloro Stellite, Inc., Co., while the backing material consists of a strip steel. The sharpness of the tooth tips of a material having a very high wear resistance is maintained longer than if the tooth tips were made of the backing material and the time period between the regrinding operations have successively been increased. Moreover, the feeding rates have also been increased. This technology, however, raises other and ever higher demands on the backing material. This particularly concerns the backing material of band saw blades, frame saw blades, and circular saw blades for sawing in wood but also in stone and other materials. Among these demands the following should be mentioned:

- a high fatigue resistance in order to be able to stand repeated bendings, varying loads, vibrations, etc;
- a good relaxation resistance in order to maintain the tensions which have been incorporated in the material in connection with the stretching or tensioning of the blade, i.e. that the blade does not loose its shape keeps its tension;
- a good brazing ability and/or weldability in order to allow the fastening of wear resistant materials on the backing material through welding or brazing and/or for joining band saw blades without impairing vital strip steel properties;
- a good grinding ability in order to avoid notch effects which commonly cause failures; and
- a good tempering resistance at the manufacturing of the blade as well as during sawing.

Besides the above mentioned demands, which the tool maker and the final user make on the material, also the steel manufacturer put some demands on the material. Thus, the steel must not be too expensive to manufacture, which i.a. implies that the steel should not contain high amounts of expensive alloying elements and also that the material should not require complicated manufacturing procedures which may be difficult to uniformly reproduce and also would cause considerable costs.

BRIEF DISCLOSURE OF THE INVENTION

It is purpose of the invention to provide a new steel alloy which satisfies the above mentioned demands. It is also an objective of the invention to provide a material which advantageously can be used as a backing material for band saw blades, frame saw blades and circular saw blades. These and other objectives can be achieved by the invention which is characterized by in the appending claims.

Briefly, the alloy is a low alloyed steel alloy having balanced amounts of in the first place carbon, silicon, and chromium and possibly also any of vanadium, niobium, or a corresponding grain refining element. Typically, the steel also has a very low content of manganese.

Carbon is required in the steel to a sufficient amount in order to form martensite together with iron at the heat treatment of the steel in order to give an adequate hardness of the steel and consequently a desired tensile strength so that the blade can be manufactured with a desired small blade thickness and also achieve a desired fatigue resistance, desired relaxation resistance, and also to "keep its tension". The carbon content therefore shall be at least 0.5%, preferably at least 0.55%, and suitably at least 0.6%. If the carbon content is too high, there is a risk for formation of graphite, which must be avoided. The carbon content therefore must not be more than 1.0%, preferably not more than 0.9%, and suitably not more than 0.8%. An optimal carbon content probably is 0.65–0.75% in the steel of the invention, while other alloying elements which interact with carbon and/or are complementary will be explained in the following.

There shall exist a high content of silicon in the steel in order to give the steel a very high relaxation resistance and a good tempering resistance in combination with other alloying elements. Silicon also contributes to afford an adequate hardenability to the steel by taking part in the martensite formation at the heat treatment of the material. Silicon therefore shall exist in an amount not less than 1%, preferably at least 1.5%. Too high contents, however, make the steel brittle, particularly at very low temperatures, which can occur when sawing outdoors during winter time in arctic or tempered climate zones. High contents of silicon also give a risk for formation of graphite which must be prevented. The steel therefore shall not contain more than 2% silicon.

Manganese is an element which normally exists in steels in order to give the steel a desired hardenability, but which also is added in order to make the influence of sulphur more harmless, as will be described below. Also the steel of the present invention shall be hardenable per se, and typically its structure, when the steel shall be used consists of tempered martensite. If the steel, however, has too high a hardenability, local portions of the steel will be hardened during grinding operations, which will cause the formation of isolated areas of untempered martensite which for several reasons shall be avoided. The same risk for a local hardening because of local heating as during grinding can also occur in connection with brazing or welding, which are operations carried out in connection with the finishing of band saw blades, frame saw blades, and circular saw blades equipped with wear resistant materials. By, i.a. keeping the manganese content at a low level, the hardenability can be restricted to a desired degree, while the controlled formation of martensite, which is desired during the heat treatment of the material is achieved by means of the high content of silicon. The steel of the invention therefore shall contain not more than 0.2% manganese, preferably not more than 0.1% manganese.

Sulphur is an undesired element in many different steel grades. In most steels, the unfavourable influence of sulphur is the formation of iron sulphide, FeS, which is precipitated in the grain boundaries and which makes the steel brittle. However, this can be moderated by means of manganese which combines with the sulphur to form harmless manganese sulphide. This mechanism can not be utilised in the steel of the invention in view of the fact that the steel does not contain manganese in sufficient amounts to achieve this result. Therefore sulphur shall be kept at a low level, which means not more than 0.01%, preferably at a very low level, suitably at no more than 0.001%, preferably not more than about 0.0005%. If the steel would contain higher amounts of sulphur, there is a great risk for brittleness, and if the steel is not heat treated in a specific way, a risk which is particularly great in view of the high silicon content.

Phosphorus is another element which, as is very well known should be kept at a very low level, preferably at not more than 0.02%, preferably at max 0.01%.

Chromium shall exist in the steel in significant amounts to be combined with carbon to form chromium carbides, which reduces the carbon activity and hence the risk for graphite formation. In order to give this effect to a desired degree, the steel should contain at least 0.1% chromium, preferably at least 0.2chromium. However, chromium increases the hardenablility, wherefore the chromium content should not exceed 0.5%, preferably not exceed 0,4%.

Optionally, the steel may also contain one or more grain refining elements in a total amount of not more than 0.20% which in the form of difficultly soluble carbides are precipitated in the grain boundaries at the solidification of the molten steel. Thus, the steel optionally may contain:

0.01–0.1%, preferably about 0.025% aluminium and 0.005–0.05%, suitably about 0.010% nitrogen, or 0.10–0.20%, suitably about 0.15% vanadium, or 0.025–0.10%, suitably about 0.05% niobium, which wholly or partly can be replaced by the double amount of tantalum, or 0.015–0.10%, suitably about 0.025% zirconium, which wholly or partly can be replaced by the same amount of titanium.

It shall also be recognised that the said grain refining additions wholly or partly can be replaced by each other in the said proportions, wherein the total amount of said grain refining elements can exist in an amount of 0.010–0.20%.

Moreover the steel should only contain iron, while other elements should not exist in amounts more than those which are typical for impurities. Undesired elements are for example nickel and molybdenum which stimulate the formation of graphite and increase the hardenability. Nickel and molybdenum therefore should not exist in amounts more than 0.1%, preferably not more than as impurities.

It is believed that the nominal composition of the steel should be, in weight-%: 0.65 C, 1.6 Si, max 0.1 Mn, max 0.01 P, max 0.001 S, 0.2 Cr, max 0.1 Ni, max 0.1 Mo, 0.025 Al, 0.010 N, balance iron and other unavoidable impurities.

The steel can be manufactured in a manner which is completely conventional though adapted in the first place to the requirements concerning low contents of manganese and sulphur and a high content of silicon. Steel strips are produced of the steel by hot and cold rolling to desired thickness. These strips are hardened from a temperature between 780° and 1000° C. and tempered at a temperature between 200° and 550° C., wherein a structure consisting of tempered martensite and possibly some amount of remaining carbides is obtained. This material is suitable to be used as backing material for band saw blades, frame saw blades and circular saw blades where the teeth consist of or are tipped with another material than the backing material.

BRIEF DESCRIPTION OF DRAWINGS

In the following description of performed experiments, reference will be made to the appending drawings, in which FIG. 1–FIG. 11 are tempering curves for the examined steel alloys which were produced at a laboratory scale;

FIG. 15–FIG. 25 are relaxation diagrams which show loss of energy versus remaining plastic deformation.

DESCRIPTION OF PREFERRED EMBODIMENTS

Figure 12:
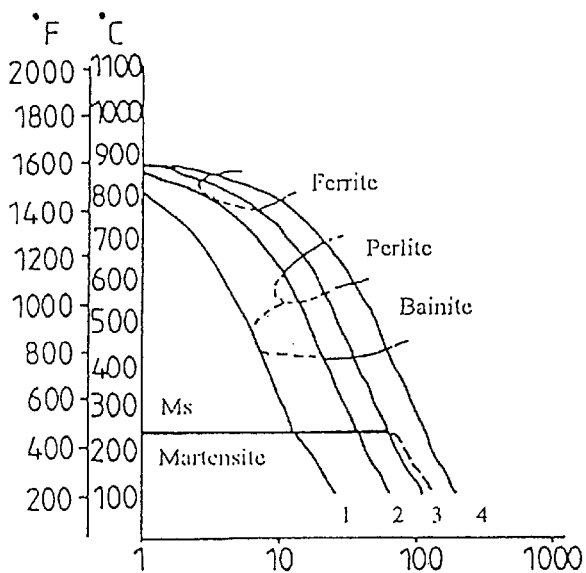
FIG. 12–FIG. 14 are CCT-diagrams for some of the steeels which were produced at a laboratory-scale.

In a first test series steels were examined having the chemical compositions given in Table 1. All contents are expressed in weight-%.

TABLE 1

| | Composition of examined steels in weight-% | | | | | | | |
|---|---|---|---|---|---|---|---|---|
| Steel No | C | Mn | Si | Ni | V | Cr | Mo | Fe Bal |
| 1 | .65 | .74 | 1.7 | — | — | .21 | — | |
| 2 | .72 | .49 | .43 | 2.1 | — | — | — | |
| 3 | .68 | .52 | 2.1 | 2.1 | — | .86 | — | |
| 4 | .67 | .50 | 1.1 | 2.1 | — | .35 | — | |
| 5 | .68 | .51 | 2.1 | 1.0 | — | .78 | — | |
| 6 | .69 | .50 | 2.2 | 2.1 | .19 | .84 | — | |
| 7 | .69 | .51 | 2.1 | 2.1 | .20 | .77 | .29 | |
| 8 | .58 | .48 | 1.8 | — | 1.8 | .30 | .29 | |
| 9 | .66 | .49 | 2.2 | 2.0 | — | .89 | .26 | |
| 10 | .38 | .45 | 2.0 | 1.0 | .13 | .80 | .30 | |
| 11 | .60 | .07 | 1.65 | — | — | .22 | — | |

Steels No. 1–11 of Table 1 were manufactured as 50 kg laboratory melts. Steels No. 1–10 have compositions corresponding to those of known martensitic strip steels. Several of these steels have previously been used and are still being used as saw steel material. Steel No. 11 has a composition according to the invention. The sulphur content which is not given in Table 1, however, was higher than what it ought to be in the steel of the invention, namely 0.005%. This is due to the difficulty to produce steels, having extremely low sulphur contents, in a 50 kg laboratory furnace. Moreover, steel No. 11 contained, as impurities, 0.007 P, 0.016 Ni, 0.004 Mo, 0.005 W, 0.011 Co, 0.015 V, 0.004 Ti, 0.001 Nb, 0.015 Cu, 0.005 Sn and <0.003 Ce. All these elements thus occurred at an impurity content level. Also the other examined steel alloys No. 1–10 contained said elements at an impurity content level.

The ingots were forged to the shape of bars having the dimensions 60×40 mm. These bars were soft annealed, whereafter micro samples having the sizes 20×15×10 mm were taken out. These samples were kept for 10 min at the hardening temperature which was chosen for each steel and thereafter quenched in water. The hardened micro samples were tempered at different temperatures. The holding time was 10 min and the samples were cooled in air. The tempering curves for the different steels are shown in FIGS. 1–11.

After heat treatment, the impact strength was determined at room temperature using unnotched test specimens having the size 7×10×55 mm. The test specimens were taken out in the longitudinal direction. By the experience from the tempering curves, a heat treatment was chosen which gave 43±1 HRC.

The following selection criteria were applied:

a hardening temperature which gives full hardness directly after hardening is desired;

a hardening temperature which gives a flat tempering curve at temperatures over 400° C. is considered to be favourable from a relaxation point of view;

several different forging temperatures were tested for steel No. 11 until a toughness was achieved which was comparable with that of the other steel in spite of the considerably high sulphur content in the steel.

Quenching was made in oil. Hardening and tempering temperatures and achieved impact strength and hardnesses are given in Table 2.

TABLE 2

| Steel No | Hardening temperature °C. | Tempering temperature °C. | Impact strength (I) | Hardness HRC |
|---|---|---|---|---|
| 1 | 950 | 550/10' | 173 | 44 |
| 2 | 880 | 475/10' | 225 | 42 |
| 3 | 880 | 652/10' | 215 | 42 |
| 4 | 880 | 550/10' | 194 | 42 |
| 5 | 880 | 625/10' | 208 | 42 |
| 6 | 1020 | 675/10' | 233 | 44 |
| 7 | 1020 | 700/10' | 195 | 43 |
| 8 | 1020 | 650/10' | 241 | 44 |
| 9 | 1020 | 675/10' | 190 | 42 |
| 10 | 1020 | 700/10' | 294 | 41 |
| 11 | 950 | 500/2 × 10' | 173 | 44 |

Figure 13:
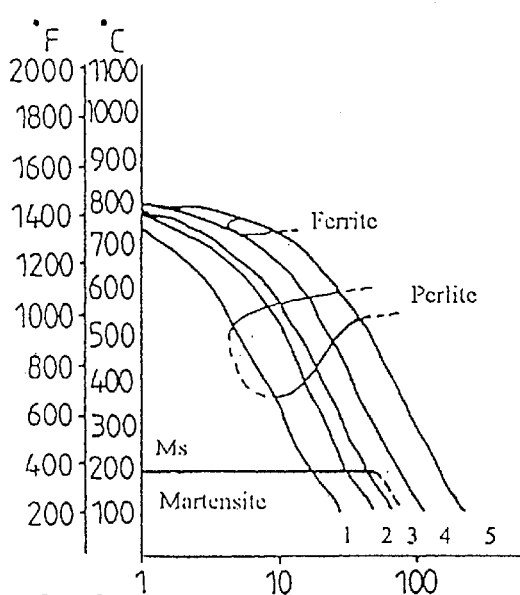
Figure 14:
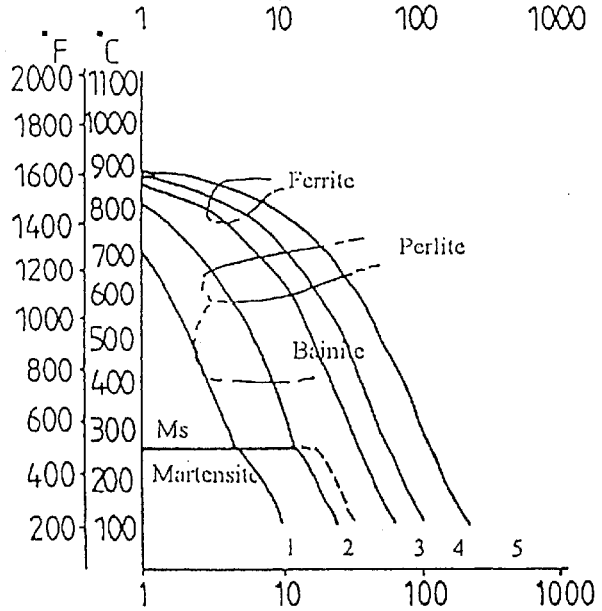
Figure 15:
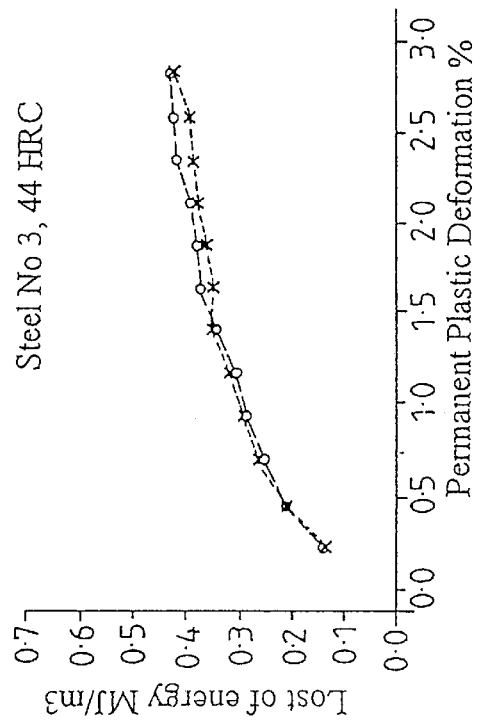
Figure 16:
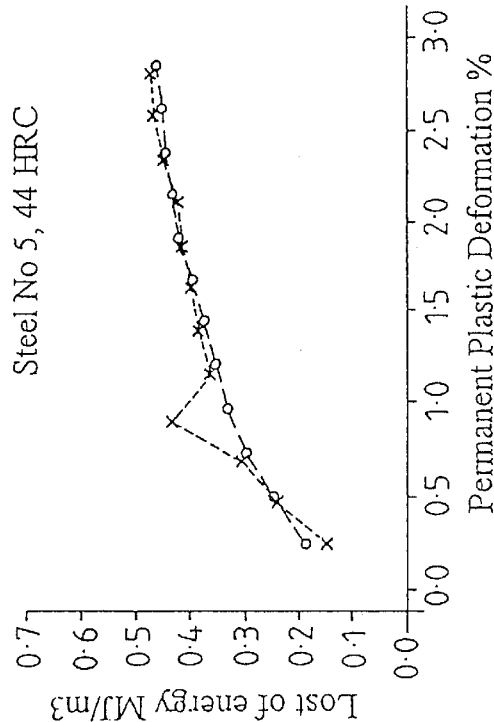
Figure 17:
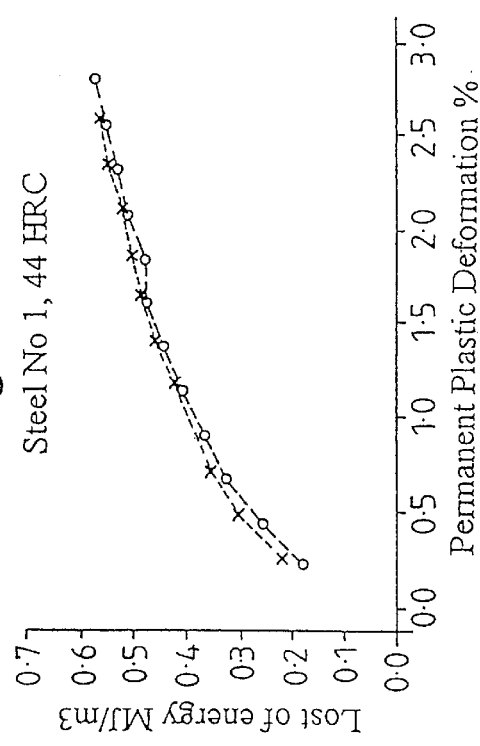
Figure 18:
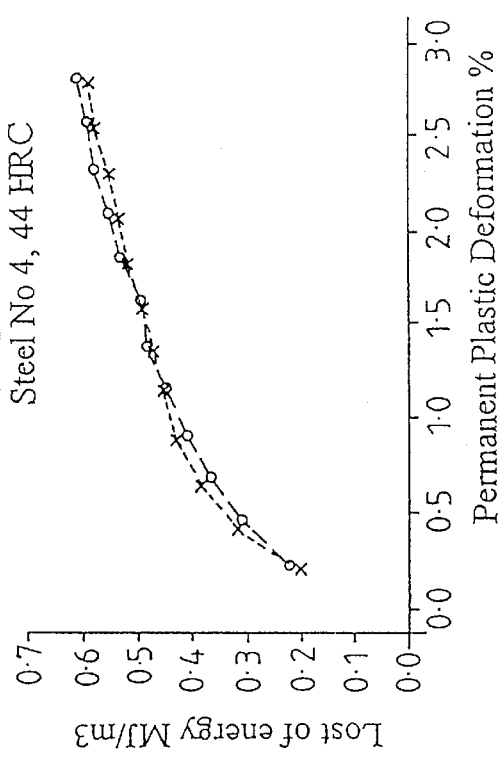

It is a feature of primary importance for a backing material for band saw blades, frame saw blades, and circular saw blades having teeth which are tipped with wear resisting materials, that the steel has not a too high hardenability in order that the backing material shall not be completely hardened through brazing, welding or grinding, etc. in connection with the finishing operation in the manufacturing of the band saw blade, frame saw blade or circular saw blade. It was believed that steels No. 1, 2 and 11 from this point of view had best conditions. First the $A_1$ and $A_3$ temperatures were determined. Thereafter dilatometric tests were made, in which the hardening temperature was chosen 30°–40° C. above the $A_3$ temperature. The obtained CCT-diagrams are shown in FIGS. 12–14. From the CCT-diagrams it is apparent that the hardenability of steel No. 11, FIG. 14, is lower than that of steel No. 1 and No. 2, FIG. 12 and FIG. 13, respectively, which is due to the very low Mn-content and the absence of other alloying elements in significant amounts.

Another very important feature of a steel which shall be used as a backing material in saw blades is that it has a good relaxation resistance in order to maintain the tension which has been incorporated in the material in connection with the stretching or tensioning of the blade, i.e. that the blade "keeps the tension". Relaxation resistance measurements were made according to the Bauschinger Hysteresis Loop method, Metallurgical Transactions A, Volume 20A, October 1989. The results are given in the diagrams in FIGS. 15–25. The higher the values, the better the relaxation resistance of the steel. Steel No. 11 of the invention turned out to have the best relaxation resistance of all the steels which were tested.

On the basis of the experiments which were performed on the steel alloys which were made at a laboratory scale, the following conclusions can be drawn.

The toughness of steel No. 11 became comparable with those of the other steels and is as good as that of steel No. 1 after some process adjustments which were caused by the high sulphur content. The hardenability of steel No. 11 is substantially lower than that of steel No. 1 and No. 2, which indicates that there is less risk for the formation of untempered martensite at the finishing operation of saw blades having a backing material of the steel of the invention, when the backing material is subjected to local heating because of brazing, welding and/or grinding. The relaxation resistance of steel No. 11 was the best among those which were tested.

On the basis of the experiences from the steel manufacturing at a laboratory scale and from the laboratory tests, thereafter a 5 tons melt was made in a high frequency furnace. The steel had the following chemical composition in weight-%:

| C | Si | Mn | P | S | Cr | Ni | Mo | Cu | Al | |
|---|---|---|---|---|---|---|---|---|---|---|
| 0.68 | 1.66 | 0.18 | 0.14 | 0.0028 | 0.21 | 0.04 | 0.01 | 0.02 | 0.02 | Balance iron and unavoidable impurities |

From the steel melt there were made ingots which were hot rolled to the shape of billets which were further hot rolled to 3 mm thick strips. After pickling, the strips were cold rolled with intermediate annealing operations to 1.47 mm thickness. Thereafter the strips were hardened to a hardness of 48 HRC and a tensile strength Rm=1600 N/m² by hardening from 940° C. and tempering at 500° C. Teeth were punched out from a strip of this material along the entire length of the strip. The strip was cut and welded to the shape of endless strips. These strips were tensioned, fine ground and the teeth were tipped with Stellite®. Finally, the teeth and the gullet bottoms were subjected to a finishing grinding operation.

Two of the manufactured band saw blades were tested in a band saw of the twin type. Normally, sawing with band saws must be interupted because the saw blades start wobbling, i.e. that the deviation from a completely straight cut exceeds a certain standard value. In this case, the sawing could proceed until it had to be stopped because the Stellite® teeth had been blunted and had to be re-sharpened. No stretching or other operation bad to be done with the backing material. After resharpening the teeth, the sawing could proceed. Totally, the two band saws were used for sawing for 38 h and 46 h, respectively, without retensioning. Normally, modern band saw blades have to be retensioned after about 8 hours of sawing. Nothing abnormal could be observed of the first mentioned band saw blade. The blade was still in condition to be used for continued sawing after resharpening the teeth. On the other blade a crack could be observed adjacent to the joint after 46 hours of operation, which, however, was not due to any defect in the blade material but due to the fact that the weld was not completely flat, which caused side bendings when the weld passed the saw wheels.

I claim:

1. A cold rolled, hardened and tempered steel alloy saw blade backing strip for receiving saw teeth of a different material wherein the steel alloy consists essentially of by weight percent:

0.55–0.9 C

1–2 Si max 0.2 Mn 0.1–0.5 Cr from traces to totally max 0.2% of additional elements selected from the group consisting of niobium, tantalum, vanadium, titanium, zirconium, aluminum, sulphur, phosphorus and nitrogen, balance iron and unavoidable impurities, said steel alloy strip having a structure consisting of tempered martensite and remaining carbides and said steel alloy strip having been hardened at a temperature between 780° C. and 1000° C. and tempered at a temperature between 200° C. and 550° C.

2. Steel alloy strip according to claim 1, which contains max 0.01 S.

3. Steel alloy strip according to claim 1 which contains max 0.001 S.

4. Steel alloy strip according to claim 1 which contains 0.6–0.8 C.

5. Steel alloy strip according to claim 4 which contains 0.65–0.75 C.

6. Steel alloy strip according to claim 1 which contains at least 1.5 Si.

7. Steel alloy strip according to claim 1 which contains 0.2–0.4 Cr.

8. Steel alloy strip according to claim 1, wherein the alloy contains a total amount of 0.010–0.2% of the additional elements.

9. Steel alloy strip according to claim 1, wherein the alloy contains max 0.1 Mn.

10. Steel alloy strip according to claim 1, wherein the saw blade backing material is configured as a backing material for a saw blade selected from a band saw blade, a frame saw blade and a circular saw blade.

11. A saw blade having teeth of a first material and a backing strip of a second material, said backing strip being a cold rolled, hardened and tempered steel alloy consisting essentially of by weight percent:

0.55–0.9 C

1–2 Si max 0.2 Mn 0.1–0.5 Cr from traces to totally max 0.2% of additional elements selected from the group consisting of niobium, tantalum, vanadium, titanium, zirconium, aluminum, sulphur, phosphorus and nitrogen, balance iron and unavoidable impurities, and said steel alloy strip having a structure consisting of tempered martensite and remaining carbides and hardened at a temperature between 780° C. and 1000° C. and tempered at a temperature between 200° C. and 550° C.

* * * * *